US009505625B2

(12) United States Patent
Le Roux et al.

(10) Patent No.: US 9,505,625 B2
(45) Date of Patent: Nov. 29, 2016

(54) METHOD FOR PREPARING A COMPOSITION INCLUDING SYNTHETIC INORGANIC PARTICLES (75) Inventors: Christophe Le Roux, Avignonet Lauragais (FR); Francois Martin, Sainte Foy D'Aigrefeuille (FR); Pierre Micoud, Peyssies (FR); Angela Dumas, Pechabou (FR)

(73) Assignees: UNIVERSITE PAUL SABATIER TOULOUSE III, Toulouse (FR); CENTRE NATIONAL DE LA RECHERCHE SCIENTIFIQUE (C.N.R.S.), Paris (FR)

( * ) Notice: Subject to any disclaimer, the term of this patent is extended or adjusted under 35 U.S.C. 154(b) by 685 days.

(21) Appl. No.: 13/996,986

(22) PCT Filed: Dec. 22, 2011

(86) PCT No.: PCT/EP2011/073862
§ 371 (c)(1),
(2), (4) Date: Sep. 16, 2013

(87) PCT Pub. No.: WO2012/085239
PCT Pub. Date: Jun. 28, 2012

(65) Prior Publication Data
US 2013/0343980 A1   Dec. 26, 2013

(30) Foreign Application Priority Data
Dec. 23, 2010 (FR) ...................................... 10/05096

(51) Int. Cl.
C01B 33/24 (2006.01)
C01B 33/22 (2006.01)
C01B 33/38 (2006.01)
C01B 33/20 (2006.01)

(52) U.S. Cl.
CPC ............... *C01B 33/22* (2013.01); *C01B 33/20* (2013.01); *C01B 33/38* (2013.01)

(58) Field of Classification Search
CPC ........ C01B 33/22; C01B 33/20; C01B 33/38
USPC ...................................... 423/331; 252/182.33
See application file for complete search history.

(56) References Cited

U.S. PATENT DOCUMENTS

| 4,626,420 A | 12/1986 | Usui et al. |
| 2001/0042704 A1 | 11/2001 | Lacombe et al. |
| 2009/0261294 A1* | 10/2009 | Martin .................... C01B 33/20 252/182.33 |

FOREIGN PATENT DOCUMENTS

| WO | 2008/009799 | 1/2008 |
| WO | 2008/009800 | 1/2008 |
| WO | 2008/009801 | 1/2008 |

OTHER PUBLICATIONS

International Search Report dated Apr. 10, 2012, corresponding to PCT/EP2011/073862.

* cited by examiner

*Primary Examiner* — Colleen Dunn
*Assistant Examiner* — Haytham Soliman
(74) *Attorney, Agent, or Firm* — Young & Thompson (57) ABSTRACT A method for preparing a composition including synthetic mineral particles, in which: a hydrogel that is a precursor of the synthetic mineral particles is prepared, and the hydrogel is subjected to a hydrothermal treatment, characterized in that at least one step of the hydrothermal treatment is carried out with the addition of at least one carboxylate salt to the treatment medium, the carboxylate salt having the formula R—COOM', where M' denotes a metal selected from the group consisting of Na and K, and R is selected from H and the alkyl groups that include fewer than 10 carbon atoms.

23 Claims, 2 Drawing Sheets

METHOD FOR PREPARING A COMPOSITION INCLUDING SYNTHETIC INORGANIC PARTICLES

The invention relates to a method for preparing a composition comprising synthetic mineral particles.

Throughout the text, "mineral particle" denotes any inorganic particle which does not contain carbon or contains carbon, where applicable, in the form of carbonate or cyanide.

Throughout the text, "hydrothermal treatment" denotes any treatment carried out, in the presence of water, at a predetermined temperature and at a pressure greater than atmospheric pressure.

Many minerals such as borates or silicates are used in various industrial fields.

Phyllosilicate mineral particles, such as talc, are used, for example, in the form of fine particles in many industrial sectors, such as: rubber, thermoplastics, elastomers, paper, paints, varnishes, textiles, metallurgy, pharmaceuticals, cosmetics, phytosanitary products or fertilizers in which phyllosilicates such as talc are used, by being incorporated into a composition, as an inert filler (for their chemical stability or for the dilution of expensive active compounds) or as functional fillers (for example to enhance the mechanical properties of some materials).

Natural talc, which is a hydroxylated magnesium silicate of the formula $Si_4Mg_3O_{10}(OH)_2$, belongs to the phyllosilicate family. The phyllosilicates are composed of an irregular stack of elementary lamellae of crystalline structure, the number of which varies from several units to several tens of units. Among the phyllosilicates (lamellar silicates), the group comprising especially talc, mica and montmorillonite is characterized by the fact that each elementary lamella is constituted by the association of two tetrahedral layers located on either side of an octahedral layer. This group corresponds to the 2:1 phyllosilicates, which include especially the smectites. In view of their structure, the 2:1 phyllosilicates are also described as being of the T-O-T (tetrahedron-octahedron-tetrahedron) type.

The octahedral layer of the 2:1 phyllosilicates is formed of two planes of $O^{2-}$ and $OH^-$ ions (in the molar proportion $O^{2-}$:$OH^-$ of 2:1). On either side of this middle layer there are two-dimensional lattices of tetrahedrons, of which one of the vertices is occupied by an oxygen of the octahedral layer, while the other three are occupied by substantially coplanar oxygens. In the natural smectites, for example, the tetrahedral sites are generally occupied by $Si^{4+}$ or $Al^{3+}$ ions and the octahedral sites are in most cases occupied by $Mg^{2+}$, $Fe^{2+}$, $Al^{3+}$ and/or $Fe^{3+}$ cations. A small proportion of the octahedral and/or tetrahedral sites of the smectites is unoccupied and is responsible for the cation deficit of the crystal lattice forming the elementary lamellae.

As regards talc, a high purity, a high lamellarity and a fineness of the particles, as well as a narrow particle size and lamellar distribution, are desirable for many of its applications, because they can be determinative for the quality of the end product.

However, the preparation of a pulverulent composition from blocks of natural talc by grinding and treating the talc do not allow the purity, the lamellarity and the size of the particles of talc obtained to be controlled.

Within this context, WO 2008/009799 proposes a method for preparing a talcose composition comprising at least one synthetic mineral containing silicon, germanium and metal of the formula $(Si_xGe_{1-x})_4M_3O_{10}H)_2$ by hydrothermal treatment of a silico/germano-metallic gel of the formula $(Si_xGe_{1-x})_4M_3O_{11}$, n'$H_2O$, in the liquid state, for a duration ranging from 3 days to 30 days and at a temperature of from 300° C. to 600° C. In a method according to WO 2008/009799, a hydrothermal treatment for a duration of 3 days at 300° C. is necessary in order to be able to obtain particles of synthetic talc having a particle size varying from 20 nm to 100 nm, or a hydrothermal treatment for a duration of 30 days at 600° C. is necessary in order to obtain particles of synthetic talc having a particle size of the order of 6 µm, the duration of the hydrothermal treatment having to be sufficiently long to allow particles of satisfactory crystallinity and thermal stability to be obtained.

Accordingly, although a method according to WO 2008/009799 permits the preparation of a synthetic mineral that is similar to talc and the purity of which can be controlled, it is hardly compatible with high industrial demands in terms of yield, efficiency and profitability.

The invention aims to propose an improved method for preparing a composition comprising synthetic mineral particles.

The invention aims to propose an improved method for preparing a composition comprising silicate synthetic mineral particles.

The invention aims to propose an improved method for preparing a composition, called a talcose composition, comprising phyllosilicate mineral particles having at least one non-swelling phase.

The invention aims to propose a method for preparing a talcose composition by a hydrothermal treatment of a silico/germano-metallic gel, the duration of which is reduced considerably as compared with the duration of a hydrothermal treatment that is necessary in a method for preparing a talcose composition described in the prior art.

The invention also aims to propose a method for preparing a composition comprising synthetic mineral particles in which a hydrothermal treatment of a hydrogel precursor of said synthetic mineral particles is carried out at a reduced temperature and/or for a reduced duration.

The invention also aims to propose a method for preparing a talcose composition in which a hydrothermal treatment of a silico/germano-metallic gel is carried out at a reduced temperature and/or for a reduced duration and which allows a talcose composition including phyllosilicate particles having improved properties to be obtained.

The invention aims to propose such a method which is simple and rapid to carry out and is compatible with the constraints of an industrial exploitation.

It is a further object of the present invention to propose a method for preparing a composition including synthetic mineral particles which can be used as a replacement for such natural compositions in various of their applications.

It is a further object of the present invention to propose a method for preparing talcose compositions which can be used as a replacement for natural talc compositions in various of their applications.

The invention aims to propose a method for preparing talcose compositions of high mineralogical and crystallochemical purity, including synthetic mineral particles having a lamellarity and particle size that are fine and of low dispersion, and a thermally stable crystal structure.

To that end, the invention relates to a method for preparing a composition comprising synthetic mineral particles, in which:

a hydrogel precursor of said synthetic mineral particles is prepared, said hydrogel is subjected to a hydrothermal treatment, wherein at least one step of said hydrothermal treatment is carried out with the addition of at least one carboxylate salt to the treatment medium, said carboxylate salt having the formula R—COOM' in which:

M' denotes a metal chosen from the group formed of Na and K, and

R is chosen from H and alkyl groups having fewer than 10 carbon atoms.

Indeed, the inventors have found, surprisingly, that a method according to the invention, in which, in a first step, a hydrogel precursor of the synthetic mineral particles is prepared and, in a second step, a hydrothermal treatment of the hydrogel is carried out with the addition of at least one carboxylate salt of the formula R—COOM' as defined hereinbefore, permits the preparation of a composition comprising synthetic mineral particles while reducing considerably the duration and/or the temperature of said hydrothermal treatment.

Advantageously and according to the invention, in the formula R—COOM' of the carboxylate salt, R is chosen from H and alkyl groups having fewer than 10 carbon atoms and in particular from a hydrogen H—, a methyl $CH_3$— and an n-propyl $CH_3$—$CH_2$—$CH_2$—. Accordingly, advantageously and according to the invention, R is chosen from the group formed of H—, $CH_3$— and $CH_3$—$CH_2$—$CH_2$—.

Advantageously and according to the invention, said synthetic mineral particles are silicate mineral particles, that is to say particles belonging to the family of the silicates, the structure of which includes [$SiO_4$] tetrahedral groups. In particular, advantageously and according to the invention, said synthetic mineral particles are phyllosilicate mineral particles, that is to say particles belonging to the family of the lamellar silicates, which includes, for example, micas and talc.

In a particularly advantageous embodiment of a method according to the invention, said hydrogel precursor of said synthetic mineral particles is a silico/germano-metallic gel of the formula $(Si_xGe_{1-x})_4M_3O_{11}$, n'$H_2O$:

M denoting at least one divalent metal having the formula $Mg_{y(1)}Co_{y(2)}Zn_{y(3)}Cu_{y(4)}Mn_{y(5)}Fe_{y(6)}Ni_{y(7)}Cr_{y(8)}$; each y(i) representing a real number of the interval [0; 1], such that $$\sum_{i=1}^{8} y(i) = 1,$$

and x being a real number of the interval [0; 1], n' referring to a number of molecule(s) of water associated with said gel containing silicon, germanium and metal.

The inventors have found, surprisingly, that a method according to the invention comprising a first step of preparing a hydrogel precursor formed of a silico/germano-metallic gel of the formula $(Si_xGe_{1-x})_4M_3O_{11}$, n'$H_2O$ and a second step of hydrothermal treatment of the silico/germano-metallic gel in the presence of at least one carboxylate salt of the formula R-LOOM' permits the preparation of a composition, called a talcose composition, comprising phyllosilicate mineral particles while reducing considerably the duration and/or the temperature of said hydrothermal treatment. No clear explanation can be given for the very surprising result obtained by the invention, which, simply by adding a carboxylate salt of the formula R—COOM' to the hydrothermal treatment medium, permits especially a considerable increase in the speed of the hydrothermal treatment, in the same manner as a catalyst. The presence of at least one carboxylate salt of the formula R—COOM' in the hydrothermal treatment medium during the hydrothermal treatment of said silico/germano-metallic gel seems to play a very important role in the germination and growth of said phyllosilicate mineral particles, especially by virtue of its influence on the pH of the hydrothermal treatment medium, throughout the hydrothermal treatment.

Advantageously and according to the invention, the carboxylate salt(s) of the formula R—COOM' is(are) added to said treatment medium so that it has, based on said hydrogel precursor of said synthetic mineral particles, a molar ratio R—COOM'/hydrogel of from 0.4 to 100. This is the molar ratio between the quantity of carboxylate salt(s) and the quantity of hydrogel in the treatment medium at the start of the hydrothermal treatment. The ratio R—COOM'/hydrogel can especially be from 1.8 to 100, in particular from 7.2 to 90 and, for example, from 40 to 90.

In a case where silicate mineral particles are prepared, advantageously and according to the invention the carboxylate salt(s) of the formula R—COOM' is(are) added to said treatment medium so that it has, based on silicon, a molar ratio R—COOM'/Si of from 0.1 to 25. This is the molar ratio between the quantity of carboxylate salt(s) and the quantity of silicon atoms in the treatment medium at the start of the hydrothermal treatment. The ratio R—COOM'/Si can especially be from 0.45 to 25, in particular from 1.8 to 22.5 and, for example, from 10 to 22.5.

At least one step of the hydrothermal treatment is carried out with the addition of at least one carboxylate salt of the formula R—COOM' to the treatment medium. The carboxylate salt(s) of the formula R—COOM' can be added to the hydrothermal treatment medium at any time during the hydrothermal treatment, for example at the start or, optionally, after a first step of hydrothermal pretreatment, for example. Advantageously and according to the invention, the carboxylate salt(s) of the formula R—COOM' is(are) added to said treatment medium at the start of said hydrothermal treatment.

Advantageously and according to the invention, the carboxylate salt(s) of the formula R—COOM' is(are) added to said treatment medium in such a manner as to adjust its pH to a value of from 8 to 12. Advantageously and according to the invention, said hydrothermal treatment is carried out at a temperature of from 150° C. to 600° C. The presence of at least one carboxylate salt of the formula R—COOM' in the hydrothermal treatment medium, in a (total) concentration of from 0.2 mol/l to 10 mol/l, apparently especially has the effect of maintaining the pH of the hydrothermal treatment medium at from 8 to 12 and avoiding a fall in the pH during the hydrothermal treatment. Indeed, the inventors have found, surprisingly, that the presence of at least one carboxylate salt of the formula R—COOM' in the hydrothermal treatment medium during the hydrothermal treatment of the gel containing silicon, germanium and metal allows the pH of said medium to be maintained at from 8 to 12. This effect on the pH is different from a buffer effect. In the case where sodium acetate is used, the pH measured during the hydrothermal treatment is, for example, 9.47, while the pKa of the acetic acid/acetate ion pair is 4.8.

The concentration of carboxylate salt(s) in the hydrothermal treatment medium is adapted to allow a composition comprising synthetic mineral particles to be obtained after a reduced hydrothermal treatment duration. Advantageously and according to the invention, the carboxylate salt(s) of the formula R—COOM' is(are) added to said treatment medium in such a manner that the concentration of carboxylate salt(s) of the formula R—COOM' in the treatment medium is from 0.2 mol/l to 10 mol/l.

Advantageously and according to the invention, said hydrothermal treatment is carried out at a temperature of from 150° C. to 600° C., in particular from 200° C. to 400° C. Accordingly, carrying out said hydrothermal treatment at a temperature of from 150° C. to 600° C., and in particular from 200° C. to 400° C., in the presence of at least one carboxylate salt of the formula R—COOM' as defined hereinbefore, allows a composition including synthetic mineral particles to be obtained. Furthermore, by virtue of the presence of at least one such carboxylate salt, a hydrothermal treatment temperature of from 250° C. to 350° C., for example a temperature of 300° C., is sufficient to obtain a composition, called a talcose composition, comprising phyllosilicate mineral particles having at least one non-swelling phase. By limiting the energy consumption required to carry it out, a method for preparing a talcose composition according to the invention is therefore more respectful of the environment (low-temperature method) than a method for preparing a talcose composition belonging to the prior art.

Advantageously and according to the invention, the duration of the hydrothermal treatment is adapted to allow said synthetic mineral particles to be obtained, especially as a function of the temperature at which the hydrothermal treatment is carried out. Advantageously and according to the invention, said hydrogel is subjected to a hydrothermal treatment for a duration of from 30 minutes to 45 days, especially from 1 hour to 15 days, in particular from 2 hours to 24 hours and more particularly from 2 hours to 12 hours.

Advantageously and according to the invention, the hydrothermal treatment of said hydrogel, and in particular of said silico/germano-metallic gel, is carried out by means of an autoclave. It can be, for example, an autoclave formed of a nickel-based alloy such as Hastelloy® (marketed by Haynes International, Kokomo, United States) or an autoclave made of titanium or optionally made of steel with a polytetrafluoroethylene (PTFE) lining in a case where the hydrothermal treatment temperature does not exceed 250° C. Such an autoclave can have any capacity, for example a capacity ranging from 200 ml to 50 liters.

Advantageously and according to the invention, said hydrothermal treatment is carried out with mechanical stirring. To that end there can be used, for example, an autoclave equipped with an internal metal screw.

Advantageously and according to the invention, said hydrothermal treatment is carried out under saturation vapour pressure and with stirring. Advantageously and according to the invention, there is added to the autoclave, with said hydrogel, and in particular with said silico/germano-metallic hydrogel, a quantity of water (preferably distilled water) that is at least sufficient to create a saturation vapour atmosphere inside the autoclave brought to the treatment temperature. Advantageously and according to the invention, said hydrothermal treatment is carried out under autogenous pressure, that is to say at a pressure that is at least equal to the saturation vapour pressure of water (pressure at which the vapour phase is in equilibrium with the liquid phase). The autogenous pressure reached in the autoclave during the hydrothermal treatment therefore depends especially on the temperature at which said hydrothermal treatment is carried out, on the volume of the autoclave and on the quantity of water present. It is likewise possible to carry out the hydrothermal treatment at a pressure greater than the saturation vapour pressure of water or greater than the autogenous pressure in the vessel in which the hydrothermal treatment is taking place. To that end, a gas that is chemically neutral with respect to the hydrothermal reaction is injected into the autoclave or the vessel in which the hydrothermal treatment is taking place. Such a gas is chosen from the group formed of the inert gases (rare gases), in particular argon, nitrogen ($N_2$), carbon dioxide and air (compressed air). In that manner, advantageously and according to the invention, the hydrothermal treatment is carried out at a pressure of from 0.5 MPa (5 bar) to 20 MPa (200 bar).

Advantageously and according to the invention, the hydrothermal treatment is carried out with a hydrogel, in particular a silico/germano-metallic gel, that is liquefied and has a liquid/solid ratio of from 2 to 20, especially from 5 to 15 (the quantity of liquid being expressed in $cm^3$ and the quantity of solid in grams). Optionally, if necessary, an appropriate quantity of water for achieving that ratio is added to said liquefied silico/germano-metallic gel.

In addition, advantageously and according to the invention, said phyllosilicate mineral particles have at least one non-swelling phase formed of a stack of elementary lamellae of the 2:1 phyllosilicate type and having the chemical formula $(Si_xGe_{1-x})_4M_3O_{10}(OH)_2$. In particular, in a particularly advantageous embodiment of a method according to the invention, said non-swelling phase can be formed of a stack of elementary lamellae of the 2:1 phyllosilicate type and having the chemical formula $Si_4M_3O_{10}(OH)_2$, and more particularly having the chemical formula $Si_4Mg_3O_{10}(OH)_2$.

Accordingly, in a particularly advantageous embodiment of a method according to the invention, at the end of a hydrothermal treatment of a silico/germano-metallic gel according to the invention there is obtained a talcose composition in the form of a colloidal solution containing phyllosilicate mineral particles having at least one non-swelling phase. The synthetic mineral particles, in solution in water, can either be in a state in which they are more or less individualized relative to one another or they are arranged into more or less coarse aggregates formed of elementary synthetic mineral particles which have combined with one another. The particle size of these elementary particles can vary from several tens of nanometers to about ten micrometers, especially depending on the applied hydrothermal treatment temperature, which is chosen from 150° C. to 600° C., in particular from 200° C. to 400° C.

Advantageously and according to the invention, at the end of the hydrothermal treatment there is recovered a colloidal composition comprising synthetic mineral particles and said composition is subjected to a drying step. Said composition including synthetic mineral particles obtained by a method according to the invention can be dried by any powder drying technique. Advantageously and according to the invention, following said hydrothermal treatment, said synthetic mineral particles obtained are dried by lyophilization. Drying can also be carried out by means of an oven, for example at a temperature of the order of 60° C., for from 12 hours to 48 hours, or under microwave irradiation.

In an advantageous embodiment of a method according to the invention, said silico/germano-metallic gel is prepared by a coprecipitation according to the reaction:

-continued $[(Si_xGe_{1-x})_4M_3O_{11}, n'H_2O] + 8NaCl + (m - n' + 1)H_2O$ m, n' and (m−n'+1) being positive integers.

Said silico/germano-metallic gel can be prepared by a coprecipitation reaction using at least one metal chloride of the formula $MCl_2$. A silico/germano-metallic gel is obtained in the form of a colloidal solution containing particles of the formula $(Si_xGe_{1-x})_4M_3O_{11}$, $n'H_2O$. It is then necessary to replace substantially all the sodium chloride obtained in the coprecipitation by at least one—especially one and only one—carboxylate salt of the formula R—COOM', before the hydrothermal treatment of said silico/germano-metallic gel is carried out. Advantageously and according to the invention, there is added to said treatment medium at least one carboxylate salt of the formula R—COOM' as an equimolar replacement for the NaCl.

The silico/germano-metallic gel is highly hydrated, and in the chemical formula:

$(Si_xGe_{1-x})_4M_3O_{11}$, $n'H_2O$ n' refers to a large number of molecules of water associated with the silico/germano-metallic gel, the exact value of which can be variable and is not known.

In a particularly advantageous embodiment of a method according to the invention, said silico/germano-metallic gel has the formula $Si_4M_3O_{11}$, $n'H_2O$. In that case, said silico/germano-metallic gel of the formula $Si_4M_3O_{11}$, $n'H_2O$ is a silicometallic gel.

Advantageously and according to the invention, following said hydrothermal treatment, said synthetic mineral particles obtained, especially said phyllosilicate particles, are dried. Advantageously and according to the invention, following said hydrothermal treatment, drying of the synthetic mineral particles obtained, especially of said phyllosilicate particles, is carried out by lyophilization. This technique of drying the phyllosilicate mineral particles contained in a talcose composition obtained by a method according to the invention allows especially individualized elementary particles to be obtained and a step of grinding said particles to be avoided.

A talcose composition, comprising phyllosilicate mineral particles having at least one non-swelling phase, prepared by a method according to the invention advantageously has, in X-ray diffraction, diffraction peaks that are characteristic of talc, and in particular a diffraction peak characteristic of a plane (001) located at a distance between 9.30 Å and 10.25 Å. Advantageously and according to the invention, said composition including phyllosilicate mineral particles has, in X-ray diffraction, the following characteristic diffraction peaks:
- a plane (001) located at a distance between 9.50 Å and 10.25 Å;
- a plane (020) located at a distance between 4.50 Å and 4.61 Å;
- a plane (003) located at a distance between 3.10 Å and 3.20 Å;
- a plane (060) located at a distance between 1.50 Å and 1.55 Å.

Furthermore, advantageously and according to the invention, said talcose composition further has at least one swelling phase.

Furthermore, advantageously and according to the invention, said swelling phase is formed of a stack of elementary lamellae of the 2:1 phyllosilicate type and at least one interfoliar space between two consecutive elementary lamellae, said swelling phase having the following chemical formula:

$Si_4M_{3-\epsilon}O_{10}(OH)_2, (X^{r+})_\epsilon \cdot nH_2O$ $X^{r+}$ denoting at least one cation, called an interfoliar cation, present in the interfoliar space(s) of said elementary lamellae of said swelling mineral phase, r being a real number of the interval [0; 3] and denoting a cation charge of the cation $X^{r+}$, $\epsilon$ being a real number of the interval [0; 3] and denoting a cation deficit of the elementary lamellae of said swelling phase, $\epsilon'$ being a real number of the interval [0; 3] and denoting a proportion of interfoliar cation(s) $X^{r+}$ present in the interfoliar space(s) of said elementary lamellae of said swelling mineral phase, and n referring to a number of molecule(s) of water associated with said swelling phase.

In the chemical formula $Si_4M_{3-\epsilon}O_{10}(OH)_2, (X^{r+})_\epsilon \cdot nH_2O$ of the swelling phase, n refers to a plurality of molecules of water linked to the swelling phase, which can in particular be present in the interfoliar space(s), in association or not in association with the interfoliar cation(s) $X^{r+}$.

In particular, advantageously and according to the invention, said talcose composition comprises phyllosilicate mineral particles formed by an interstratification between said swelling phase and said non-swelling phase. A talcose composition comprising phyllosilicate mineral particles formed by such an interstratification can be obtained, for example, following a hydrothermal treatment carried out at a temperature of from 150° C. to 300° C.

Such a talcose composition including phyllosilicate mineral particles formed by an interstratification between a swelling phase and a non-swelling phase can then be subjected to an anhydrous heat treatment, carried out at a pressure below 5 bar (0.5 MPa), at a temperature of from 300° C. to 600° C. for from 1 to 15 hours, especially for from 2 to 10 hours, for example a heat treatment for 4 hours at a temperature of from 500° C. to 550° C.

Accordingly, in a variant of a method according to the invention, following said hydrothermal treatment there is carried out an anhydrous heat treatment at a temperature of from 300° C. to 600° C. Such an anhydrous heat treatment allows a talcose composition comprising phyllosilicate mineral particles formed by an interstratification between a swelling phase and a non-swelling phase to be converted at least partially into a talcose composition including phyllosilicate mineral particles formed solely of a non-swelling phase of the chemical formula $(Si_xGe_{1-x})_4M_3O_{10}(OH)_2$, and in particular of the chemical formula $Si_4M_3O_{10}(OH)_2$.

The invention also relates to a method for preparing a composition, called a talcose composition, including phyllosilicate mineral particles that is characterized in combination by all or some of the features mentioned hereinabove or hereinbelow.

Other objects, advantages and features of the invention will become apparent upon reading the description and examples which follow and which refer to:

the accompanying FIG. 1 showing a diffractogram corresponding to the X-ray diffraction analysis carried out on a composition obtained by a method according to the invention, and the accompanying FIG. 2 showing a diffractogram corresponding to the X-ray diffraction analysis carried out on a composition obtained by a method according to the invention.

A.—General Protocol for the Preparation of a Composition Comprising Synthetic Mineral Particles According to the Invention

The preparation of a composition including synthetic mineral particles according to the invention comprises a first step of preparing a hydrogel precursor of said synthetic mineral particles, then a step of hydrothermal treatment of the hydrogel precursor, during which at least one carboxylate salt of the formula R—COOM' is added.

A protocol for the preparation of a composition including phyllosilicate mineral particles, especially talcose particles, is described more particularly below.

1.—Preparation of a Silico/Germano-Metallic Gel

The silico/germano-metallic gel can be prepared by a coprecipitation reaction involving, as reagent, at least one metal chloride of the formula $MCl_2$. The coprecipitation reaction allows a hydrated silico/germano-metallic gel and having the stoichiometry of talc (4 Si for 3 M, M having the formula $Mg_{y(1)}Co_{y(2)}Zn_{y(3)}Cu_{y(4)}Mn_{y(5)}Fe_{y(6)}Ni_{y(7)}Cr_{y(8)}$) to be obtained.

The silico/germano-metallic gel is prepared by a coprecipitation according to the following reaction equation:

The reaction is carried out starting from:
1. an aqueous solution of penta-hydrated sodium metasilicate or an aqueous solution of sodium metagermanate, or a mixture of those two solutions in the molar proportions x:(1−x),
2. a metal chloride solution prepared with one or more metal salt(s) (in the form of hygroscopic crystals) diluted in distilled water, and
3. a 1N hydrochloric acid solution.

The silico/germano-metallic gel is prepared according to the following protocol:
1. the hydrochloric acid solution and the metal chloride solution are mixed,
2. that mixture is added to the sodium metasilicate and/or sodium metagermanate solution; the coprecipitation gel forms instantly,
3. the gel is recovered after centrifugation (from 3000 to 7000 revolutions per minute for from 5 to 20 minutes, for example 3500 revolutions per minute for 15 minutes) and removal of the supernatant (sodium chloride solution that has formed),
4. the gel is washed with water, in particular with distilled or osmozed water, at least two washing/centrifugation cycles being carried out,
5. the gel is recovered after centrifugation.

At the end of this first phase, a highly hydrated silico/germano-metallic gel $(Si_xGe_{1-x})_4M_3O_{11}$, n'$H_2O$, which has a gelatinous consistency, is obtained. The gel can have thixotropic behavior, that is to say it can pass from a viscous state to a liquid state when it is stirred and then return to its initial state after a certain rest period.

The highly hydrated gel recovered after centrifugation can be dried, for example in an oven (60° C., 2 days), by lyophilization or by drying under microwave irradiation, before being subjected to a hydrothermal treatment. Drying of the silico/germano-metallic gel $(Si_xGe_{1-x})_4M_3O_{11}$, n'$H_2O$ allows a powder to be obtained which can be stored and rehydrated before being used to undergo a hydrothermal treatment according to the invention.

2—Hydrothermal Treatment of the Silico/Germano-Metallic Gel

The silico/germano-metallic gel $(Si_xGe_{1-x})_4M_3O_{11}$, n'$H_2O$ as obtained hereinbefore, which may or may not have been dried, is subjected to a hydrothermal treatment at a temperature of from 150° C. to 600° C., in particular from 200° C. to 400° C.

To that end:
1. the gel, previously dried or in liquefied form, is placed in a reactor/autoclave,
2. a solution comprising at least one carboxylate salt of the formula R—COOM' (in hydrated or anhydrous form) is added to said gel, with stirring,
3. the liquid/solid ratio is optionally adjusted to a value of from 2 to 20, especially from 5 to 15 (the quantity of liquid being expressed in cm³ and the quantity of solid in grams),
4. the reactor/autoclave is placed inside an oven, at a predetermined reaction temperature (established from 150° C. to 600° C.) throughout the treatment.

The gel can optionally be dried after addition of the solution comprising the carboxylate salt(s) of the formula R—COOM' so that, for example, it can be stored until the hydrothermal treatment. It will then simply be necessary to mix the dried gel already comprising the carboxylate salt(s) with water in order to establish the desired liquid/solid ratio.

The inventors have found that the temperature of the hydrothermal treatment influences the particle size of the particles obtained. The lower that temperature, the smaller the synthesized particles (of the order of several tens of nanometers at 300° C., compared with about ten micrometers for higher temperatures).

The inventors have also noted that a relatively short duration of the hydrothermal treatment is sufficient to allow the initial gelatinous mass to be converted into a crystallized and thermally stable solid material.

During the hydrothermal treatment, the silico/germano-metallic gel gradually loses its gelatinous consistency and adopts a particular crystalline structure, the crystallinity of which increases with time. This gradual crystallization of the material has been detected by X-ray diffraction analyses and is reflected in the corresponding diffractograms in the rapid appearance of characteristic peaks, which become sharper and intensify rapidly throughout the treatment.

The hydrothermal treatment yields a colloidal talcose composition comprising phyllosilicate mineral particles suspended in water. At the end of the hydrothermal treatment, the gel contained in the reactor is recovered by centrifugation (from 3000 to 7000 revolutions per minute, for from 5 to 20 minutes), followed by removal of the supernatant. The supernatant solution contains said salt(s) of the formula R—COOM' and can be stored in order to recover and recycle the carboxylate salt(s).

The recovered gel is then preferably washed with water, in particular with distilled or osmozed water, at least two washing/centrifugation cycles being carried out.

The solid composition recovered after the last centrifugation can then be dried:
- in an oven at 60° C. for 12 hours, or
- by lyophilization, for example in a lyophilizer of the CHRIST ALPHA® 1-2 LD Plus type, for from 48 hours to 72 hours.

There is ultimately obtained a divided solid composition, the color of which is dependent on the nature of the metal chloride(s) used in the preparation of the silico/germano-metallic gel (and also, where appropriate, on the respective proportions of those metal chlorides).

The phyllosilicate mineral particles contained in a talcose composition obtained by a method according to the invention have remarkable properties in terms of purity, crystallinity and thermal stability, and those properties are obtained with a duration of the hydrothermal treatment that is reduced significantly as compared with the duration of the hydrothermal treatment previously necessary in a known method for preparing a talcose composition.

Following the hydrothermal treatment, the talcose composition obtained can optionally be subjected to an anhydrous heat treatment, which is carried out at a pressure below 5 bar (0.5 MPa), at a temperature of from 300° C. to 600° C. for from 1 to 15 hours, in particular if it includes phyllosilicate mineral particles formed by an interstratification between a swelling phase and a non-swelling phase. Such an anhydrous heat treatment can be carried out in the case where a talcose composition comprising phyllosilicate mineral particles formed by an interstratification between a swelling phase and a non-swelling phase is to be converted into a talcose composition comprising phyllosilicate mineral particles formed solely of a non-swelling phase.

B—Structural Analysis and Characterization

The analysis results of compositions including synthetic mineral particles obtained by a method according to the invention are described below.

The analysis results of a talcose composition obtained following the protocol described hereinbefore are reported below. These results confirm that it is possible by means of the invention effectively to form synthetic phyllosilicate mineral particles having structural characteristics (especially lamellarity and crystallinity) that are very similar to those of natural talcs. They also show that, especially by the choice of temperature and duration of implementation, the invention permits the extremely simple synthesis of synthetic mineral silico/germano-metallic particles that are stable and pure and have a size and crystalline characteristics that are defined and foreseeable.

The analyses were carried out especially by X-ray diffraction and by observation under an electron microscope. The collected data are presented in the accompanying figure and in Examples 1 to 11, and are commented on hereinbelow.

1—X-Ray Diffraction Analyses

In X-ray diffraction, natural talc is, for example, known to have especially four characteristic diffraction peaks:
- for the plane (001), a peak located at a distance of 9.35 Å;
- for the plane (020), a peak located at 4.55 Å;
- for the plane (003), a peak located at 3.14 Å;
- for the plane (060), a peak located at 1.52 Å.

Figure 1:
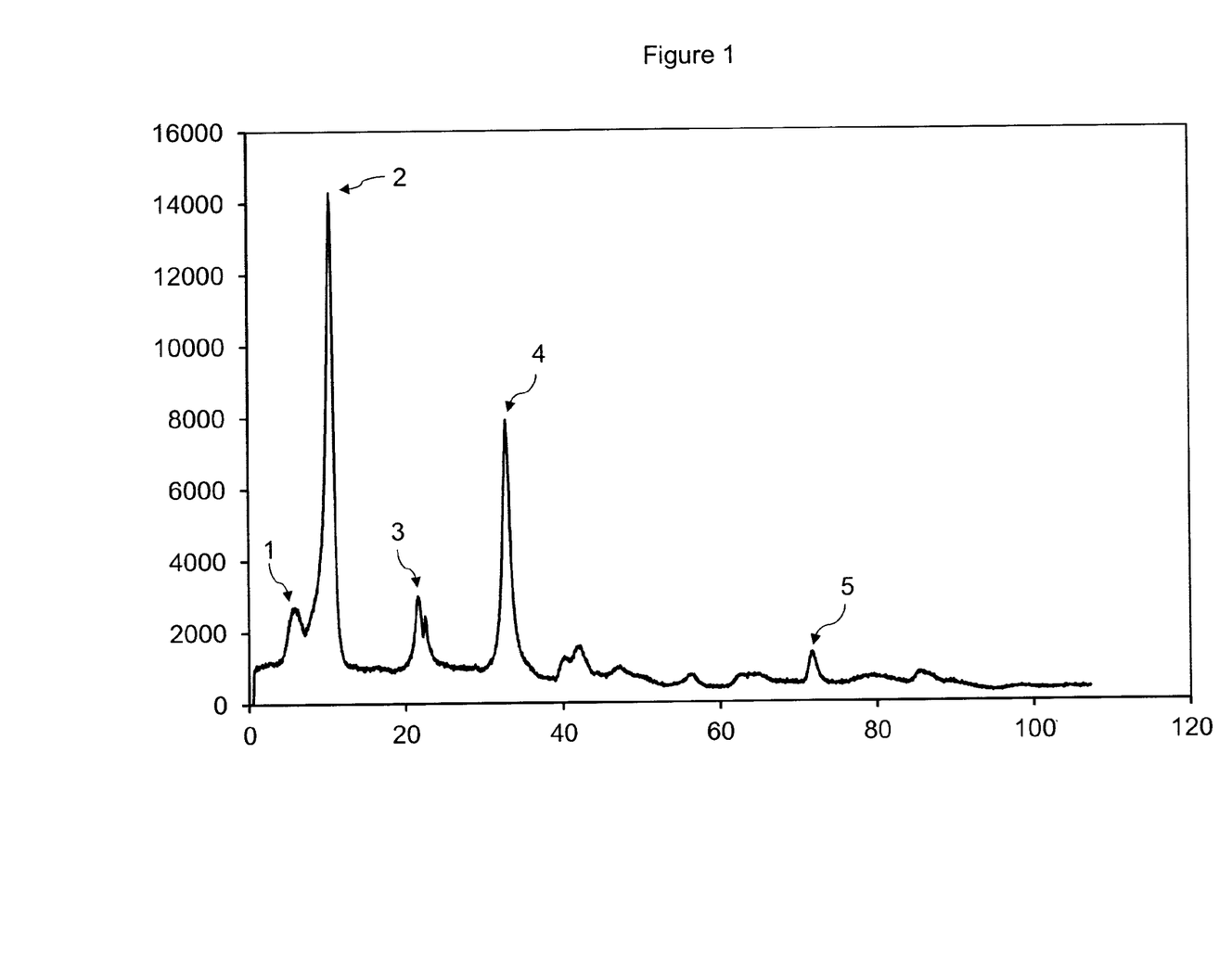

FIG. 1 shows the results of analyses carried out by X-ray diffraction on a synthetic talc composition, of the formula $Si_4Mg_3O_{10}(OH)_2$, prepared by the method described hereinbefore (with $Mg^{2+}$ as the octahedral cation), after precipitation of a silicometallic gel followed by replacement of the NaCl by sodium acetate at a concentration of 1 mol/l and with hydrothermal treatment at 300° C. for 6 hours.

Figure 2:
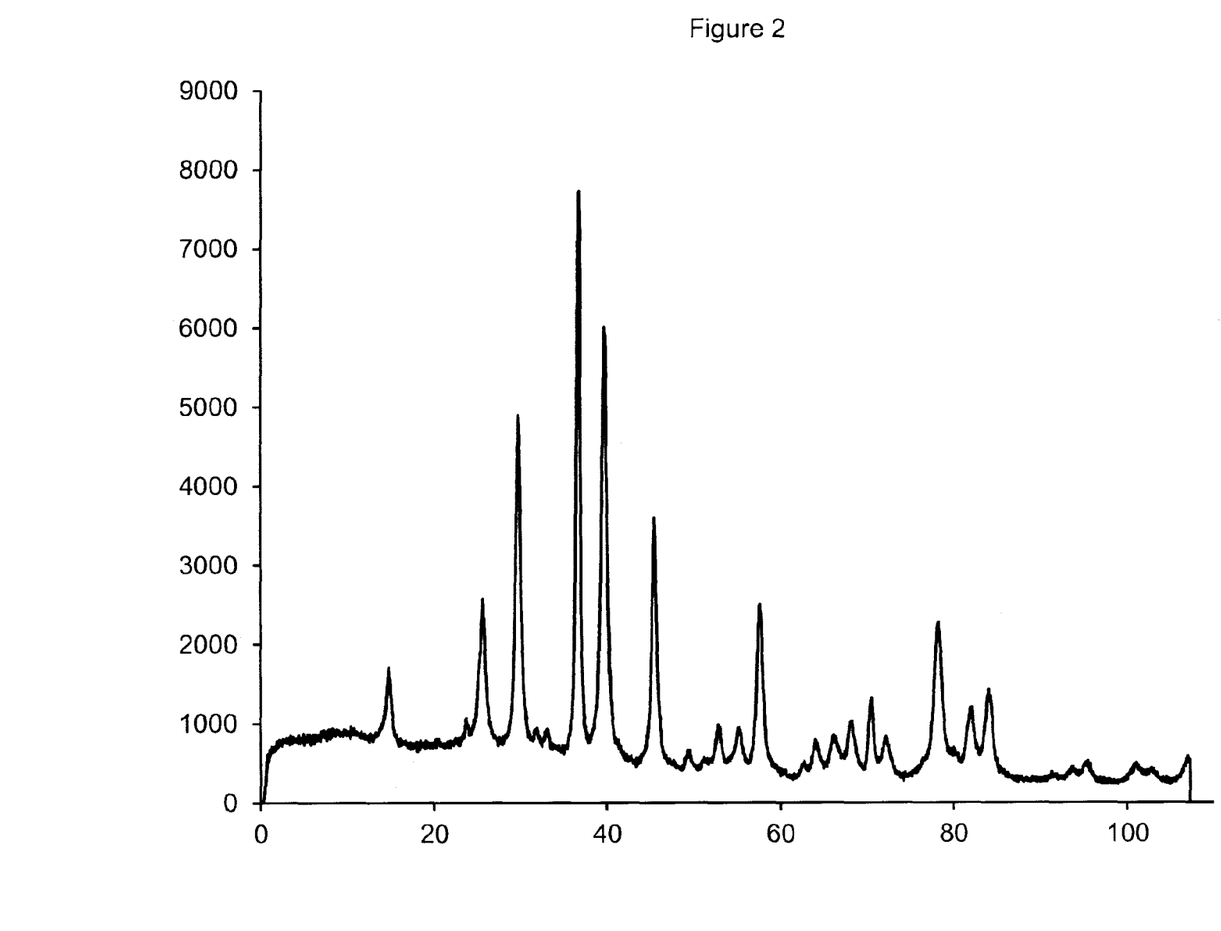

FIG. 2 shows the results of analyses carried out by X-ray diffraction on a synthetic zinc silicate composition, of the formula $Zn_2SiO_4$, after precipitation of a hydrogel precursor of said zinc silicate particles, followed by addition of sodium acetate at a concentration of 4 mol/l and hydrothermal treatment at 250° C. for 6 hours.

On each of the RX diffractograms of FIGS. 1 and 2, the intensity of the signal (number of counts per second) is shown as a function of the diffraction angle 2θ.

In particular, the diffractogram shown in FIG. 1 has signals corresponding to the signals of talc at 2θ angle values of 5.72 degrees; 10.60 degrees; 21.65 degrees; 22.59 degrees; 32.90 degrees; 40.10 degrees; 41.97 degrees; 71.73 degrees; 85.40 degrees.

The RX diffractograms shown in FIGS. 1 and 2 were recorded on a CPS 120 device marketed by INEL (Artenay, France). This is a diffractometer with a curved detector, allowing detection in real time over an angle domain of 120°. The acceleration voltage used is 40 kV and the intensity 25 mA. The Bragg equation giving the structural equidistance is: $d_{hkl}=0.89449/\sin \theta$ (with the use of a cobalt anticathode).

This X-ray diffraction analysis confirms that there is great structural similarity between the phyllosilicate mineral particles of the talcose compositions prepared according to the invention and the particles of natural talc, as well as between the zinc silicate mineral particles prepared according to the invention and the natural zinc silicate particles.

In particular, diffraction peaks 3, 4 and 5 (FIG. 1), which correspond to the planes (020), (003) and (060), respectively, have positions which coincide perfectly with those of the reference diffraction peaks for natural talc.

As regards the prepared talcose compositions, only the position of diffraction peaks 1 and 2 of plane (001) differs slightly from the position of the reference peak (9.60-10.25 Å instead of 9.35 Å). This difference in values is essentially explained by:
- a nanometric particle size, in contrast to that of natural talcs,
- a slight residual hydration of the phyllosilicate mineral particles, which increases the inter-reticular distance d(001) owing to the presence of water molecules intercalated between the lamellae of the talc, and
- optionally, the nature of the octahedral cations of the crystal lattice.

However, it must be noted that the difference resulting from the residual hydration diminishes with slightly longer reaction times and more forced drying.

Finally, the full width at half maximum of the peaks of planes (001), (020), (003) and (060) demonstrates the good crystallinity of the mineral silico/germano-metallic particles of the talcose compositions according to the invention.

2—Microscopic Observations and Assessment of the Particle size of the Particles

In view of the considerable fineness of the powders of which the talcose compositions according to the invention can be constituted, the size and particle size distribution of the phyllosilicate mineral particles composing them were assessed by observation under a field-emission scanning electron microscope and under a transmission electron microscope.

It is found that the particle size of the elementary particles varies between 20 nm and 100 nm.

In addition, measurements of the specific surface area (area of the surface of the particles based on a unit of mass) of the synthesized mineral particles, determined by the BET method by the quantity of argon adsorbed at the surface of said particles so as to form a monomolecular layer covering said surface completely (measurements by the BET method, AFNOR standard X 11-621 and 622), were carried out. It is found that the specific surface area of the phyllosilicate mineral particles included in a talcose composition obtained by a method according to the invention (after precipitation of a silicometallic gel and replacement of the NaCl by sodium acetate at a concentration of 1 mol/l and hydrothermal treatment at 300° C. for 6 hours, then drying by lyophilization) is 175 m$^2$/g.

Such a value of the specific surface area, while the specific surface area of a natural talc is of the order of 20 m$^2$/g, can especially be indicative of a very small particle size, of the lamellar nature of the synthesized particles, of the divided state of the (non-agglomerated) particles and optionally of exfoliation of the elementary lamellae forming said non-swelling phase.

Examples 1 to 11 below illustrate the preparation method according to the invention and the structural characteristics of the compositions comprising synthetic mineral particles, and in particular of the talcose compositions including phyllosilicate mineral particles, so obtained.

Example 1

Preparation of a Composition Comprising Synthetic Mineral Particles According to the Invention An aqueous solution of trihydrated sodium acetate CH$_3$—COONa.3H$_2$O at a concentration of 1.3M is prepared. 2 g of silicometallic gel previously dried by lyophilization are dispersed in 27 ml of the sodium acetate solution. The suspension obtained is placed in a closed titanium reactor. The titanium reactor is placed in an oven at a temperature of 300° C. for 6 hours.

After cooling to ambient temperature, the reactor is opened and the suspension including the white powder is centrifuged. The supernatant sodium acetate solution is recovered and can be recycled.

The white paste separated from the acetate solution is washed twice with demineralized water and then dried in an oven brought to a temperature of 130° C. for 12 hours. After drying, 1.13 g of white solid are obtained.

FIG. 1 shows the X-ray diffractogram of the synthetic talc composition, of formula Si$_4$Mg$_3$O$_{10}$(OH)$_2$, so obtained.

The X-ray diffractogram of this talcose composition has diffraction peaks corresponding to the diffraction peaks of talc, and in particular the following characteristic diffraction peaks:
  a plane (001) located at a distance of 9.717 Å (I=100);
  a plane (020) located at a distance of 4.605 Å (I=9);
  a plane (003) located at a distance of 3.157 Å (I=50);
  a plane (060) located at a distance of 1.525 Å (I=5).

The intensity I of the corresponding peaks that is given is normalized relative to the most intense peak of the diffractogram, the intensity of the most intense peak being taken to be 100.

Diffraction peaks 2, 3, 4 and 5 shown on the diffractogram of FIG. 1 correspond respectively to the plane (001), to the plane (020), to the plane (003) and to the plane (060) identified above.

The X-ray diffractogram of this talcose composition also has a diffraction peak 1 corresponding to a plane (001) located at a distance of 17.267 Å (for I=10), representing a swelling phase.

Example 2

Preparation of a Composition Comprising Synthetic Mineral Particles According to the Invention The method described in Example 1 is reproduced, in which an aqueous solution of trihydrated sodium acetate at a concentration of 0.2M is used and a hydrothermal treatment of a silico/germano-metallic gel (previously dried by lyophilization) is carried out at a temperature of 300° C. for 6 hours.

The X-ray diffractogram of this talcose composition has diffraction peaks corresponding to the diffraction peaks of talc, and in particular the following characteristic diffraction peaks:
  a plane (001) located at a distance of 9.930 Å (I=100);
  a plane (020) located at a distance of 4.535 Å (I=65);
  a plane (003) located at a distance of 3.178 Å (I=60);
  a plane (060) located at a distance of 1.521 Å (I=32).

On the X-ray diffractogram of this talcose composition, the diffraction peak corresponding to the plane (001) has a slight shoulder representing a swelling phase that is present in a very small proportion relative to the non-swelling phase.

Example 3

Preparation of a Composition Comprising Synthetic Mineral Particles According to the Invention The method described in Example 1 is reproduced, in which an aqueous solution of trihydrated sodium acetate at a concentration of 2M is used and a hydrothermal treatment of a silico/germano-metallic gel (previously dried by lyophilization) is carried out at a temperature of 300° C. for 6 hours.

The X-ray diffractogram of this talcose composition has diffraction peaks corresponding to the diffraction peaks of talc, and in particular the following characteristic diffraction peaks:
  a plane (001) located at a distance of 9.704 Å (I=92);
  a plane (020) located at a distance of 4.548 Å (I=100);
  a plane (003) located at a distance of 3.164 Å (I=74);
  a plane (060) located at a distance of 1.521 Å (I=57).

On the X-ray diffractogram of this talcose composition, the diffraction peak corresponding to the plane (001) has a slight shoulder representing a swelling phase that is present in a very small proportion relative to the non-swelling phase.

Example 4

Preparation of a Composition Comprising Synthetic Mineral Particles According to the Invention The method described in Example 1 is reproduced, in which an aqueous solution of trihydrated sodium acetate at a concentration of 1.3M is used and a hydrothermal treatment of a silico/germano-metallic gel (previously dried by irradiation with microwaves) is carried out at a temperature of 300° C. for 6 hours.

The X-ray diffractogram of this talcose composition has diffraction peaks corresponding to the diffraction peaks of talc, and in particular the following characteristic diffraction peaks:

a plane (001) located at a distance of 9.715 Å (I=100);
a plane (020) located at a distance of 4.552 Å (I=9);
a plane (003) located at a distance of 3.149 Å (I=70);
a plane (060) located at a distance of 1.526 Å (I=9).

The X-ray diffractogram of this talcose composition also has a diffraction peak corresponding to a plane (001) located at a distance of 18.383 Å (for I=10) representing a swelling phase.

Example 5

Preparation of a Composition Comprising Synthetic Mineral Particles According to the Invention The method described in Example 1 is reproduced, in which an aqueous solution of trihydrated sodium acetate at a concentration of 1.3M is used and a hydrothermal treatment of a silico/germano-metallic gel (previously dried in an oven) is carried out at a temperature of 300° C. for 6 hours.

The X-ray diffractogram of this talcose composition has diffraction peaks corresponding to the diffraction peaks of talc, and in particular the following characteristic diffraction peaks:
a plane (001) located at a distance of 10.088 Å (I=100);
a plane (020) located at a distance of 4.542 Å (I=50);
a plane (003) located at a distance of 3.150 Å (I=52);
a plane (060) located at a distance of 1.523 Å (I=25).

The X-ray diffractogram of this talcose composition also has a diffraction peak corresponding to a plane (001) located at a distance of 18.224 Å (for I=25) representing a swelling phase.

Example 6

Preparation of a Composition Comprising Synthetic Mineral Particles According to the Invention The method described in Example 1 is reproduced, in which an aqueous solution of trihydrated sodium acetate at a concentration of 4M is used and a hydrothermal treatment of a silico/germano-metallic gel (previously dried by irradiation with microwaves) is carried out at a temperature of 300° C. for 6 hours.

The X-ray diffractogram of this talcose composition has diffraction peaks corresponding to the diffraction peaks of talc, and in particular the following characteristic diffraction peaks:
a plane (001) located at a distance of 9.699 Å (I=100);
a plane (020) located at a distance of 4.557 Å (I=9);
a plane (003) located at a distance of 3.161 Å (I=30);
a plane (060) located at a distance of 1.522 Å (I=8).

The X-ray diffractogram of this talcose composition also has a diffraction peak corresponding to a plane (001) located at a distance of 20.239 Å (for I=5) representing a swelling phase.

Example 7

Preparation of a Composition Comprising Synthetic Mineral Particles According to the Invention The method described in Example 1 is reproduced, in which an aqueous solution of trihydrated sodium acetate at a concentration of 4M is used and a hydrothermal treatment of a silico/germano-metallic gel (previously dried in an oven) is carried out at a temperature of 300° C. for 6 hours.

The X-ray diffractogram of this talcose composition has diffraction peaks corresponding to the diffraction peaks of talc, and in particular the following characteristic diffraction peaks:
a plane (001) located at a distance of 9.683 Å (I=100);
a plane (020) located at a distance of 4.566 Å (I=10);
a plane (003) located at a distance of 3.153 Å (I=35);
a plane (060) located at a distance of 1.524 Å (I=10).

The X-ray diffractogram of this talcose composition also has a diffraction peak corresponding to a plane (001) located at a distance of 19.840 Å (for I=9) representing a swelling phase.

Example 8

Preparation of a Composition Comprising Synthetic Mineral Particles According to the Invention The method described in Example 1 is reproduced, in which an aqueous solution of trihydrated sodium acetate at a concentration of 1.3M is used and a hydrothermal treatment of a silico/germano-metallic gel (previously dried by lyophilization) is carried out at a temperature of 350° C. for 2 hours.

The X-ray diffractogram of this talcose composition has diffraction peaks corresponding to the diffraction peaks of talc, and in particular the following characteristic diffraction peaks:
a plane (001) located at a distance of 9.899 Å (I=50);
a plane (020) located at a distance of 4.536 Å (I=100);
a plane (003) located at a distance of 3.155 Å (I=50);
a plane (060) located at a distance of 1.515 Å (I=65).

Example 9

Preparation of a Composition Comprising Synthetic Mineral Particles According to the Invention The method described in Example 1 is reproduced, in which an aqueous solution of potassium acetate $CH_3$—COOK at a concentration of 1.3M is used and a hydrothermal treatment of a silico/germano-metallic gel (previously dried by lyophilization) is carried out at a temperature of 300° C. for 6 hours.

The X-ray diffractogram of this talcose composition has diffraction peaks corresponding to the diffraction peaks of talc, and in particular the following characteristic diffraction peaks:
a plane (001) located at a distance of 10.241 Å (I=100);
a plane (020) located at a distance of 4.517 Å (I=44);
a plane (003) located at a distance of 3.315 Å (I=45);
a plane (060) located at a distance of 1.515 Å (I=20).

The X-ray diffractogram of this talcose composition also has a diffraction peak corresponding to a plane (001) located at a distance of 12.562 Å (for I=20) representing a swelling phase.

Example 10

Preparation of a Composition Comprising Synthetic Mineral Particles According to the Invention The method described in Example 1 is reproduced, in which an aqueous solution of sodium formate HCOONa at a concentration of 1.3M is used and a hydrothermal treatment of a silico/germano-metallic gel (previously dried by lyophilization) is carried out at a temperature of 300° C. for 6 hours.

The X-ray diffractogram of this talcose composition has diffraction peaks corresponding to the diffraction peaks of talc, and in particular the following characteristic diffraction peaks:
  a plane (001) located at a distance of 10.029 Å (I=90);
  a plane (020) located at a distance of 4.520 Å (I=90);
  a plane (003) located at a distance of 3.170 Å (I=100);
  a plane (060) located at a distance of 1.520 Å (I=70).

On the X-ray diffractogram of this talcose composition, the diffraction peak corresponding to the plane (001) has a shoulder representing a swelling phase that is present in a small proportion relative to the non-swelling phase.

Example 11

Preparation of a Composition Comprising Synthetic Mineral Particles According to the Invention The method described in Example 1 is reproduced, in which an aqueous solution of sodium butyrate $CH_3$—$CH_2$—$CH_2$—COONa at a concentration of 1M is used and a hydrothermal treatment of a silico/germano-metallic gel (previously dried by lyophilization) is carried out at a temperature of 300° C. for 6 hours.

The X-ray diffractogram of this talcose composition has diffraction peaks corresponding to the diffraction peaks of talc, and in particular the following characteristic diffraction peaks:
  a plane (001) located at a distance of 10.025 Å (I=100);
  a plane (020) located at a distance of 4.510 Å (I=18);
  a plane (003) located at a distance of 3.168 Å (I=75);
  a plane (060) located at a distance of 1.519 Å (I=15).

On the X-ray diffractogram of this talcose composition, the diffraction peak corresponding to the plane (001) has a shoulder representing a swelling phase that is present in a small proportion relative to the non-swelling phase.

Comparative Example 12

The method described in Example 1 is reproduced, in which sodium acetate is replaced by magnesium acetate $CH_3$—$COOMg.4H_2O$ at a concentration of 1.3M and a hydrothermal treatment of a silico/germano-metallic gel (previously dried by lyophilization) is carried out at a temperature of 300° C. for 6 hours.

The X-ray diffractogram of the composition so obtained does not have a diffraction peak corresponding to the diffraction peaks of talc.

Comparative Example 13

The method described in Example 1 is reproduced, in which sodium acetate is replaced by calcium acetate $CH_3$—$COOCa.H_2O$ at a concentration of 1.3M and a hydrothermal treatment of a silico/germano-metallic gel (previously dried by lyophilization) is carried out at a temperature of 300° C. for 6 hours.

The X-ray diffractogram of the composition so obtained does not have any diffraction peak corresponding to the diffraction peaks of talc.

Comparative Example 14

The method described in Example 1 is reproduced, in which sodium acetate is replaced by sodium hydrogen carbonate $NaHCO_3$ (commonly called "sodium bicarbonate") at a concentration of 1.3M and a hydrothermal treatment of a silico/germano-metallic gel (previously dried by lyophilization) is carried out at a temperature of 300° C. for 6 hours.

The X-ray diffractogram of the composition so obtained does not have any diffraction peak corresponding to the diffraction peaks of talc.

Comparative Example 15

The method described in Example 1 is reproduced, in which sodium acetate is replaced by sodium carbonate $Na_2CO_3$ at a concentration of 1.3M and a hydrothermal treatment of a silico/germano-metallic gel (previously dried by lyophilization) is carried out at a temperature of 300° C. for 6 hours.

The X-ray diffractogram of the composition so obtained does not have any diffraction peak corresponding to the diffraction peaks of talc.

None of the hydrothermal treatment conditions described in Comparative Examples 12 to 15 allows a talcose composition including phyllosilicate mineral particles to be obtained after a hydrothermal treatment at a temperature of 300° C. for 6 hours and in the presence of a salt other than a carboxylate salt of the formula R—COOM'.

Comparative Example 16

The method described in Example 1 is reproduced, but in the absence of carboxylate salt. A hydrothermal treatment of a silico/germano-metallic gel (previously dried in an oven) at a temperature of 350° C. for 18 hours is necessary in order to allow a talcose composition to be obtained.

The X-ray diffractogram of this talcose composition has diffraction peaks corresponding to the diffraction peaks of talc, and in particular the following characteristic diffraction peaks:
  a plane (001) located at a distance of 9.860 Å (I=100);
  a plane (020) located at a distance of 4.533 Å (I=95);
  a plane (003) located at a distance of 3.149 Å (I=81);
  a plane (060) located at a distance of 1.520 Å (I=73).

In comparison with Example 5, using the same starting product (precipitation of a silico/germano-metallic gel and drying of the gel in an oven), even when the hydrothermal treatment temperature is increased by 50° C., 18 hours are required to obtain a talcose composition, instead of 6 hours at 300° C. in the presence of sodium acetate (1.3M).

The hydrothermal treatment conditions described in each of Examples 1 to 11 all allow talcose compositions including phyllosilicate mineral particles having at least one non-swelling phase to be obtained. X-ray diffraction analysis of the various talcose compositions prepared in Examples 1 to 11 makes it possible to confirm the presence of a non-swelling phase formed of a stack of elementary lamellae of the 2:1 phyllosilicate type and of the chemical formula $Si_4M_3O_{10}(OH)_2$ by identification of the diffraction peaks characteristic of talc.

Furthermore, it is clear from all the preceding examples that only a hydrothermal treatment in the presence of a carboxylate salt of the formula R—COOM' (M' denoting a metal chosen from the group formed of Na and K, and R being chosen from H and alkyl groups having fewer than 10 carbon atoms) allows a talcose composition including phyllosilicate mineral particles having at least one non-swelling phase to be obtained in less than 10 hours, such as under the conditions described in each of Examples 1 to 11.

Example 17

Preparation of a Composition Comprising Synthetic Mineral Particles According to the Invention A hydrogel precursor of zinc silicate particles of the formula $Zn_2SiO_4$ is first prepared. To that end there are prepared on the one hand a solution comprising 10.6 g of pentahydrated sodium metasilicate ($Na_2OSiO_2$, 5 $H_2O$) dissolved in 100 ml of distilled water and on the other hand a solution comprising 21.95 g of dihydrated zinc acetate $Zn(CH_3COO)_2$ dissolved in 100 ml of distilled water. The zinc acetate solution is added to the sodium metasilicate solution, with magnetic stirring. A white precipitate forms instantly.

The solution obtained is stirred for 5 minutes, and then the hydrogel precursor of zinc silicate particles is recovered by centrifugation (for 5 minutes at 4000 revolutions/min) and 2 consecutive cycles of washing with distilled water and centrifugation.

The hydrogel obtained is added to 100 ml of distilled water and dried by lyophilization.

A hydrothermal treatment of the previously prepared hydrogel precursor of zinc silicate particles is then carried out. To that end, an aqueous solution of trihydrated sodium acetate $CH_3$—$COONa.3H_2O$ at a concentration of 4M is prepared. 2 g of silicometallic gel previously dried by lyophilization are dispersed in 27 ml of this sodium acetate solution. The suspension obtained is placed in a closed titanium reactor. The titanium reactor is placed in an oven at a temperature of 250° C. for 6 hours.

After cooling to ambient temperature, the reactor is opened and the suspension comprising the white powder is centrifuged. The supernatant sodium acetate solution is recovered and can be recycled.

The white paste separated from the acetate solution is washed 3 times with demineralized water and then dried in an oven brought to a temperature of 130° C. for 12 hours. After drying, 1.51 g of white pulverulent solid are obtained.

FIG. 2 shows the X-ray diffractogram of the zinc silicate composition, of formula $Zn_2SiO_4$, so obtained.

The X-ray diffractogram of that zinc silicate composition shown in FIG. 2 has the following diffraction peaks:

7.00 Å (I=13); 4.03 Å (I=26); 3.48 Å (I=56); 2.84 Å (I=100); 2.63 Å (I=80); 2.31 Å (I=45); 1.86 Å (I=30); 1.55 Å (I=13); 1.42 Å (I=28); 1.36 Å (I=13); 1.33 Å (I=16).

The intensity I of the corresponding peaks that is given is normalized relative to the most intense peak of the diffractogram, the intensity of the most intense peak being taken as 100.

The diffraction peaks of the zinc silicate $Zn_2SiO_4$ as defined in the corresponding JCPDS file (willemite) are as follows:

6.97 Å (I=14); 4.09 Å (I=16); 4.02 Å (I=33); 3.48 Å (I=72); 2.83 Å (I=100); 2.63 Å (I=86); 2.31 Å (I=50); 1.86 Å (I=40); 1.55 Å (I=17); 1.42 Å (I=34); 1.41 Å (I=24); 1.36 Å (I=18); 1.34 Å (I=19).

Comparative Example 18

The process described in Example 17 is reproduced, but in the absence of sodium acetate. A hydrothermal treatment carried out in water (without carboxylate salt) of the hydrogel precursor of zinc silicate particles (previously dried in an oven) at a temperature of 250° C. for 6 hours is not sufficient to obtain a zinc silicate composition, of formula $Zn_2SiO_4$.

Indeed, the X-ray diffractogram of the composition obtained after such a hydrothermal treatment does not have the diffraction peaks corresponding to the diffraction peaks of a zinc silicate.

Accordingly, it is clear from Examples 17 and 18 that only a hydrothermal treatment of a hydrogel precursor of synthetic mineral particles, such as zinc silicate particles $Zn_2SiO_4$, in the presence of a carboxylate salt of the formula R—COOM' (M' denoting a metal chosen from the group formed of Na and K, and R being chosen from H and alkyl groups having fewer than 10 carbon atoms) allows a composition comprising such zinc silicate particles to be obtained at the end of a reduced duration (6 hours) and at a temperature of 250° C.

The invention can be the subject of many other applications and of different variants with respect to the embodiments and examples described above. In particular, said talcose composition can comprise phyllosilicate mineral particles in which different metals are located at octahedral sites, such that in $(Si_xGe_{1-x})_4M_3O_{11}$, $n'H_2O$, M has the formula $(Co_{0.5}Ni_{0.5})$ or $(Mg_{0.34}Cu_{0.33}Fe_{0.33})$.

The invention claimed is:

1. A method for preparing a composition comprising synthetic mineral particles, said method comprising:
   preparing a hydrogel precursor of said synthetic mineral particles; and
   subjecting said hydrogel precursor to a hydrothermal treatment,
   wherein at least one step of said hydrothermal treatment is carried out with the addition of at least one carboxylate salt to the treatment medium, said carboxylate salt having the formula R—COOM' wherein:
   M' denotes a metal selected from the group consisting of Na and K, and
   R is selected from the group consisting of H and alkyl groups having fewer than 10 carbon atoms.

2. The method as claimed in claim 1, wherein R is selected from the group consisting of H—, $CH_3$— and $CH_3$—$CH_2$—$CH_2$—.

3. The method as claimed in claim 1, wherein said synthetic mineral particles are silicate mineral particles.

4. The method as claimed in claim 1, wherein said synthetic mineral particles are phyllosilicate mineral particles.

5. The method as claimed in claim 1, wherein said hydrogel precursor of said synthetic mineral particles is a gel of the formula $(Si_xGe_{1-x})_4M_3O_{11}$, $n'H_2O$, wherein:
   M denotes at least one divalent metal having the formula $Mg_{y(1)}Co_{y(2)}Zn_{y(3)}Cu_{y(4)}Mn_{y(5)}Fe_{y(6)}Ni_{y(7)}Cr_{y(8)}$;
   wherein each y(i) represents a real number of the interval [0; 1], such that $$\sum_{i=1}^{8} y(i) = 1,$$

wherein
x is a real number of the interval [0; 1],
n' refers to a number of molecule(s) of water associated with said gel.

6. The method as claimed in claim 1, wherein said at least one carboxylate salt of the formula R—COOM' is added to said treatment medium so to provide, based on said hydrogel precursor of said synthetic mineral particles, a molar ratio R—COOM'/hydrogel of from 0.4 to 100.

7. The method as claimed in claim 3, wherein said at least one carboxylate salt of the formula R—COOM' is added to said treatment medium to provide, based on silicon, a molar ratio R—COOM'/Si of from 0.1 to 25.

8. The method as claimed in claim 1, wherein said at least one carboxylate salt of the formula R—COOM' is added to said treatment medium at the start of said hydrothermal treatment.

9. The method as claimed in claim 1, wherein said at least one carboxylate salt of the formula R—COOM' is added to said treatment medium so as to adjust its pH to a value of from 8 to 12.

10. The method as claimed in claim 1, wherein said at least one carboxylate salt of the formula R—COOM' is added to said treatment medium so that the concentration of carboxylate salt of the formula R—COOM' in the treatment medium is from 0.2 mol/l to 10 mol/l.

11. The method as claimed in claim 1, wherein said hydrothermal treatment is carried out at a temperature of from 150° C. to 600° C.

12. The method as claimed in claim 1, wherein said hydrothermal treatment is carried out under saturation vapour pressure and with stirring.

13. The method as claimed in claim 1, wherein, following said hydrothermal treatment, said synthetic mineral particles obtained are dried by lyophilization.

14. The method as claimed in claim 1, wherein, following said hydrothermal treatment, an anhydrous thermal treatment is carried out at a temperature of from 300° C. to 600° C.

15. The method as claimed in claim 5, wherein said gel is prepared by a coprecipitation according to the reaction:

$$[(Si_xGe_{1-x})_4M_3O_{11}, n'H_2O] + 8NaCl + (m - n' + 1)H_2O$$

wherein m, n' and (m-n'+1) are positive integers.

16. The method as claimed in claim 5, wherein said gel has the formula $Si_4M_3O_{11}$, n'$H_2O$.

17. The method as claimed in claim 4, wherein said phyllosilicate mineral particles have at least one non-swelling phase formed of a stack of elementary lamellae of 2:1 phyllosilicate and having the chemical formula $(Si_xGe_{1-x})_4M_3O_{10}(OH)_2$.

18. The method as claimed in claim 4, wherein said composition including phyllosilicate mineral particles has, in X-ray diffraction, the following characteristic diffraction peaks:
 a plane (001) located at a distance between 9.50 Å and 10.25 Å;
 a plane (020) located at a distance between 4.50 Å and 4.61 Å;
 a plane (003) located at a distance between 3.10 Å and 3.20 Å; and
 a plane (060) located at a distance between 1.50 Å and 1.55 Å.

19. The method as claimed in claim 5, wherein said at least one carboxylate salt of the formula R—COOM' is added to said treatment medium to provide, based on said hydrogel precursor of said synthetic mineral particles, a molar ratio R—COOM'/hydrogel of from 0.4 to 100.

20. The method as claimed in claim 4 wherein said at least one carboxylate salt of the formula R—COOM' is added to said treatment medium to provide, based on silicon, a molar ratio R—COOM'/Si of from 0.1 to 25.

21. The method as claimed in claim 5 wherein said at least one carboxylate salt of the formula R—COOM' is added to said treatment medium to provide, based on silicon, a molar ratio R—COOM'/Si of from 0.1 to 25.

22. The method as claimed in claim 17 wherein said composition including phyllosilicate mineral particles has, in X-ray diffraction, the following characteristic diffraction peaks:
 a plane (001) located at a distance between 9.50 Å and 10.25 Å;
 a plane (020) located at a distance between 4.50 Å and 4.61 Å;
 a plane (003) located at a distance between 3.10 Å and 3.20 Å; and
 a plane (060) located at a distance between 1.50 Å and 1.55 Å.

23. The method as claimed in claim 1, wherein said hydrothermal treatment is carried out at a temperature of from 200° C. to 400° C.

* * * * *